3,185,718
PREPARATION OF CYCLOPENTADIENYL COORDINATION COMPOUNDS OF GROUPS VIII AND IB METALS
Jerome E. Brown, Detroit, and Earl G. De Witt, Royal Oak, Mich., and Hymin Shapiro, East Baton Rouge, La., assignors to Ethyl Corporation, New York, N.Y., a corporation of Virginia
No Drawing. Filed Dec. 9, 1957, Ser. No. 701,311
7 Claims. (Cl. 260—439)

This application is a continuation-in-part of our prior co-pending application S.N. 325,224, filed December 10, 1952, and now U.S. Patent 2,816,416, and S.N. 622,243, filed November 15, 1956.

The instant invention relates to a class of novel organometallic compounds and processes for their manufacture. More particularly, the present invention relates to novel and useful metallic cyclomatic compounds and to the use of such compounds.

An object of this invention is to provide as new compositions of matter a novel class of organometallic compounds. Likewise, it is an object of this invention to provide processes for the preparation of these new compositions of matter. An additional object of the present invention is to provide a class of metallic cyclomatic compounds of particular utility as additives. Other important objects of the instant invention will become apparent from the discussion hereinafter.

In our prior co-pending application, Serial No. 325,224, we have described and claimed a new class of metallic cyclomatic compounds as well as methods for their preparation. The new class of compounds of our co-pending application, Serial No. 325,224, is therein defined as having the general formula $MA_xB_yC_z$ wherein M is a metal, A is a cyclomatic hydrocarbon radical, and each of B and C can be the same or different and is an electron donating group different from a cyclomatic radical such that $a_n$ plus $5x$ plus $py$ plus $qz$ equals S, wherein S is the atomic number of an inert gas of the $n$th period, $x$ is a small whole integer from 1 to 2 inclusive, $y$ is a small whole integer from 1 to 4 inclusive, $z$ is a small whole integer from 0 to 4 inclusive, $n$ is a period of the Periodic Table and is greater than 1, $p$ and $q$ are the number of electrons donated by B and C respectively, and $a_n$ is the atomic number of M and is defined such that $a_n$ is within the parameters $(S_{n-1}+1)$ and $(S_n-6)$.

Reference to the generic formula described hereinabove indicates that there are three primary constituents of these compositions of matter. These are the metallic constituents designated as M, the cyclomatic hydrocarbon radical designated as A, and a different electron donating group designated as B. In certain embodiments of these novel cyclomatic compounds of the present invention, there are two different electron donating groups, B and C.

The present invention is directed to certain of the compounds of our aforementioned co-pending application which possess outstanding utility as additives for fuels used in present-day spark-fired internal combustion engines. These particular compounds constitute compositions of the above general formula wherein the metallic constituent M is a metal of Groups VIII and IB of the Periodic Table.

Before attempting further amplification of the nature of the compounds of the present invention, it is desirable to first consider in detail each of the primary constituents of these compounds. As mentioned above, the compounds of the present invention comprise those compounds of our prior co-pending application, Serial No. 325,224, wherein the metallic constituent, that is, M of the above general formula, is a metal of Groups VIII and IB of the Periodic Table. Thus the metals present in the novel cyclopentadienyl coordination compounds of this invention include in Group VIII, iron, ruthenium, osmium, cobalt, rhodium, iridium, nickel, palladium and patinum; and in Group IB, copper, silver and gold. Thus the metals present in the compounds of this invention are in the 4th, 5th and 6th periods of the Periodic Table and have atomic numbers of from 26 through 29, 44 through 48 and 76 through 80 inclusive and the atomic number of these metals is within the parameters $(S_n-10)$ and $(S_n-7)$ where $n$ represents the numerals 4, 5 and 6. (The Periodic Table referred to is that appearing on pages 392 and 393 of the Handbook of Chemistry and Physics, 37th edition, published by the Chemical Rubber Publishing Company, Cleveland, Ohio, in 1955.)

The second primary constituent of the new composition of matter of the present invention designated by the symbol A in the formula presented hereinbefore comprises a cyclomatic radical, that is, a cyclopentadiene-type hydrocarbon radical which is a radical containing the cyclopentadienyl moiety. In general, such cyclomatic hydrocarbon groups can be represented by the formulae:

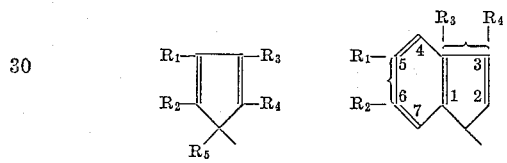

where the R's are selected from the group consisting of hydrogen and univalent organic hydrocarbon radicals.

A preferred class of cyclomatic radicals suitable in the practice of this invention are those which contain from 5 to about 13 carbon atoms. These are exemplified by cyclopentadienyl, indenyl, methylcyclopentadienyl, propylcyclopentadienyl, diethylcyclopentadienyl, phenylcyclopentadienyl, tert-butyl cyclopentadienyl, p-ethylphenyl cyclopentadienyl, 4 tert-butyl indenyl and the like. The compounds which yield these radicals are preferred as they are the more readily available cyclomatic compounds and the metallic cyclomatic coordination compounds obtainable from them have the more desirable characteristics of volatility and solubility which are prerequisites of superior hydrocarbon additives.

The third primary constituent of the new compositions of matter of the present invention is designated as an electron donating group other than a cyclopentadienyl containing radical. Such groups are represented by the symbols B and C of the aforementioned generic formula. The electron donating group present in the compounds of this invention are entities which are capable of sharing electrons with a metal atom so that the metal atom achieves a rare gas structure by virtue of the added electrons of the electron donating groups and the cyclopentadienyl group. These electron donating groups are either radicals or molecular species which contain labile electrons, which electrons assume more stable configuration in the molecule when associated with a metal to give the metal the configuration of the next heavier rare gas in the outer shell thereof, that is, the metal is in the state of maximum covalency. Hydrogen and the methyl radical serve as examples of entities which donate a single electron, while carbon monoxide and ammonia are illustrative of two electron donors. For the sake of clarity, the electron donating groups applicable to the compounds of this invention are described by combining these groups according to the number of electrons which they are capable of donating as shown in Table I.

Table I

ELECTRON DONATING GROUPS

| Number of electrons donated: | Donating group |
|---|---|
| 1 | H; R; CN |
| 2 | CO; $NH_3$; $NR_3$, $PR_3$; $PX_3$ |
| 3 | NO |

R in Table I represents a univalent organic hydrocarbon radical such as an alkyl, aryl, aralkyl and alkaryl radical. Such univalent hydrocarbon radicals are exemplified by methyl, ethyl, propyl, isobutyl, 2,2-dimethylpropyl, nonyl, tetradecyl, hexadecyl, propenyl, 2-pentenyl, phenyl and alkyl and aryl substituted phenyl radicals such as 2,5-diethylphenyl; 2-phenylethyl and other aryl substituted alkyl radicals such as naphthylbuytl, cyclohexyl, methylcyclohexyl and the like. Those having up to about 12 carbon atoms are preferred as they are the more readily available and their employment leads to more easily purified products. X in Table I represents halogen, i.e. fluorine, bromine, chlorine, or iodine.

This invention therefore comprises a cyclopentadienyl metal coordination compound wherein the metal is selected from Groups VIII and IB of the Periodic Table and wherein the metal achieves the electron configuration of the next higher rare gas by coordination with a cyclopentadienyl group in addition to electron donor groups selected from radicals and molecular species which contain labile electrons. The novel cyclopentadienyl coordination compounds of this invention have the formula $MAB_yC_z$ wherein M is as defined above, A is cyclopentadienyl hydrocarbon radical and B and C are electron donating groups other than a cyclopentadienyl group, $y$ is a small integer from 1 to 5 inclusive and $z$ is a small integer from 0 to 2 inclusive.

A preferred class of compounds within the purview of this invention are those in which the metal is selected from the 4th period of the Periodic Table, i.e. iron, cobalt, nickel and copper. These compounds are preferred as they are readily prepared from available starting materials and in general exhibit the necessary stability prerequisite to a fuel additive.

Of the compounds represented by the formula $MAB_xC_z$ those of which B is the carbonyl group are preferred as it has been found that such compounds possess attributes which render them of particular utility as antiknock additives to liquid hydrocarbons.

The general methods for the preparation of the cyclomatic compounds of the instant invention comprise three types. The first type involves the introduction into a metallic compound of a cyclomatic group or groups, followed by the introduction into the resulting intermediate compound of secondary groups designated herein as electron donating groups. A variation of this first general type of reaction comprises reacting the desired metal in a suitable active form with a cyclomatic hydrocarbon or a metallic cyclomatic compound to form an intermediate metallic cyclomatic compound followed by the introduction therein of electron donating groups. The second general type of reactions for the preparation of the novel organometallic compounds of the present invention comprises concurrently introducing into either a metallic compound, a metal per se or an active form thereof, a cyclomatic group or groups and an electron donating group or groups. The third general method for preparing our cyclomatic compounds consists of introducing into a metallic compound containing the secondary or electron donating groups the cyclopentadienyl moiety-containing groups. The discussion hereinafter serves to elucidate each of these three general methods.

The first general method for the preparation of the new and novel cyclomatic compounds of the instant invention, that is, the method involving introducing into a metallic compound of the desired metal a cyclomatic group or groups followed by an electron donating group or groups, is generally conducted in two steps. The first step involves the formation of an intermediate cyclomatic metal compound by the reaction of an active cyclomatic metal compound, such as cyclomatic magnesium halides, cyclomatic alkali metal compounds, cyclomatic zinc halides and the like with a compound of the desired metal. The second step, which in this case is conducted subsequent to the first step, involves reacting the aforesaid intermediate compound with or without prior isolation in such a manner as to introduce therein the desired electron donating groups. The reactions involved in the second step of this general method can be conducted in either the liquid phase at atmospheric pressure or thereabove or in the gaseous or vapor phase under suitable conditions of temperature and pressure. The following illustrative reactions are typical of the first type of general method for the preparation of our cyclomatic compounds.

By reacting a cyclomatic Grignard reagent such as cyclopentadienyl magnesium bromide, with a nickel compound such as nickel bromide in a liquid medium, for example, a mixture of ether and benzene, we can prepare as an intermediate compound, a di-(cyclopentadienyl)nickel. By subsequently reacting this intermediate compound with NO, a cyclopentadienyl nickel nitrosyl is formed. Such a compound is illustrated by cyclopentadienyl nickel nitrosyl. Likewise, we can prepare a cyclomatic cobalt carbonyl by essentially analogous reaction steps. More specifically, by reacting in a suitable liquid medium a cobalt compound such as cobaltous chloride with an active cyclomatic compound such as a cyclomatic Grignard reagent or a cyclomatic alkali metal compound, we form an intermediate cyclomatic cobalt compound which then can be reacted with carbon monoxide, preferably under pressure, to form a cyclomatic cobalt carbonyl, such as cyclopentadienyl cobalt dicarbonyl. More specifically, by reacting in a suitable liquid medium a copper compound such as cuprous chloride with an active cyclomatic compound such as a cyclomatic Grignard reagent or a cyclomatic alkali metal compound, we form an intermediate cyclomatic copper compound which then can be reacted with carbon monoxide, preferably under pressure, to form a cyclomatic copper carbonyl, such as cyclopentadienyl copper carbonyl. Other related processes will be apparent to those skilled in the art.

A variation of the first general type of reaction previously described consists essentially of modifying the first step of the two-step procedure. Thus, instead of utilizing as a starting material a compound of the desired metal to prepare an intermediate cyclomatic metallic compound, the latter can be prepared by the reaction of either a cyclomatic hydrocarbon, such as cyclopentadiene, or a cyclomatic radical-containing compound with the desired metal in a suitable active form, with or without a catalyst. The following reactions serve as illustrations of this alternate overall procedure.

By reacting iron metal, preferably as a finely divided active powder, with a cyclomatic hydrocarbon such as cyclopentadiene with or without a catalyst under suitable conditions of temperature, we can prepare as an intermediate material a cyclomatic iron conpound such as di-(cyclopentadienyl)iron. This intermediate compound can then be treated with a mixture of nitric oxide and carbon monoxide to form a cyclomatic iron nitrosyl carbonyl. Additional reactions of this type will become apparent to those skilled in the art.

The second general method for the preparation of the cyclomatic compounds of the present invention, that of concurrently introducing both cyclomatic and electron donating groups into a metallic compound, involves similar reactions to those described hereinbefore. However, the major difference between the two methods is essentially the point at which the secondary group is introduced into the reaction sequence, which in some cases is an extremely critical feature. Following are illustrative examples of the second type of reaction we can employ to prepare cyclomatic compounds.

By co-mingling in a suitable reaction vessel a cobalt compound, such as cobaltous chloride, a cyclomatic Grignard reagent and carbon monoxide, which mixture is preferably maintained under pressure in excess of atmospheric pressure we obtain a cyclomatic cobalt carbonyl such as cyclopentadienyl cobalt dicarbonyl.

By mixing in a suitable reaction vessel a copper compound such as cuprous chloride, a cyclomatic Grignard reagent and carbon monoxide, which mixture is preferably maintained under pressure in excess of atmospheric pressure we obtain a cyclomatic copper carbonyl such as cyclopentadienyl copper carbonyl. Similarly, by introducing into a suitable reaction vessel a copper compound such as cuprous bromide a cyclomatic Grignard reagent and an organic amine such as, for example, trimethyl amine, triphenyl amine, and the like, we can prepare a cyclomatic copper organic amine compound having the general formula CyCuNR$_3$ wherein Cy is a cyclomatic group. Similarly, by concurrently reacting a metal such as copper with a cyclomatic hydrocarbon and carbon monoxide in the presence of an active metal catalyst, we can prepare a cyclomatic copper carbonyl for example (2-methylcyclopentadienyl)copper carbonyl. Other essentially analogous processes within the spirit and scope of the present invention will be apparent to those skilled in the art. Similarly, by concurrently reacting a metal such as cobalt with a cyclomatic hydrocarbon and carbon monoxide in the presence of an active metal catalyst, we can prepare a cyclomatic cobalt carbonyl, for example, (2-methylcyclopentadienyl)cobalt dicarbonyl. Other essentially analogous processes within the spirit and scope of the present invention will be apparent to those skilled in the art.

The third general method for the preparation of the new and novel compounds of this invention consists of reacting either a compound of the desired metal or the desired metal per se with a suitable reagent such that the desired coordinating or electron donating group or groups is introduced into the starting material. The resulting intermediate compound can then be reacted in situ or can be isolated and reacted with an active cyclomatic metallic compound such as a cyclomatic Grignard reagent or a cyclomatic alkali metal compound to prepare the desired compound.

By reacting a suitable copper compound such as cuprous chloride with an organic amine such as triethyl amine, triphenyl amine, and the like, the corresponding complex addition compound is formed. Such compounds can be exemplified by the dimeric substance possessing the general formula [CuCl·NR$_3$]$_2$. This intermediate compound can then be reacted with a cyclomatic Grignard reagent, for example, cyclopentadienyl magnesium iodide to prepare a cyclomatic copper organic amine compound. Such a compound is illustrated by cyclopentadienyl copper-triethyl amine. Similarly, by reacting a suitable copper compound such as cuprous bromide with phosphorus trifluoride, a complex addition compound is formed. By reacting this addition compound with a cyclomatic Grignard reagent or a cyclomatic alkali metal compound, the corresponding cyclomatic copper phosphorus trifluoride compound, one of the embodiments of the present invention, can be prepared. An illustrative example of such a compound is cyclopentadienyl copper phosphorus trifluoride. Other variations within the contemplation of the present invention will become apparent to those skilled in the art.

As a further example, by reacting iron with carbon monoxide an iron carbonyl such as iron pentacarbonyl is prepared, which upon further reaction with a cyclomatic hydrocarbon such as cyclopentadiene forms an intermediate which when reacted with a compound having the active alkyl groups such as methyl iodide forms a compound of this invention such as cyclopentadienyl methyl iron dicarbonyl. Other variations within the contemplation of the present invention will be apparent to those skilled in the art.

The new compositions of matter of the present invention are still further illustrated by the following examples wherein all parts and percentages are by weight.

EXAMPLE I

To a pressure resistant vessel equipped with temperature measuring device, gas inlet and outlet means, agitation means, heating and cooling means, and means for adding reagents under pressure, is added 185 parts of methylcyclopentadienyl magnesium bromide and 450 parts of ether. The vessel and Grignard solution are cooled to about 40° C. and 130 parts of finely powdered anhydrous cobaltous chloride is added. The vessel is flushed with nitrogen and then with carbon monoxide pressure between 1000 and 2000 p.s.i.g. When the vessel reaches 27° C., heat is applied to raise the contents to about 50° C. and the vessel is again allowed to cool. Constant agitation is maintained throughout the reaction period. Upon cooling the room temperature, the contents of the vessel discharged and the methylcyclopentadienyl cobalt dicarbonyl is separated from the reaction mixture by fractional distillation at reduced pressure.

Cyclopentadienyl cobalt dicarbonyl is prepared in a similar manner, starting with cyclopentadienyl magnesium iodide. This compound is a dark red liquid which boils at about 75° C. at a reduced pressure of 22 millimeters of mercury.

EXAMPLE II

Under a nitrogen atmosphere, 1.82 moles of sodium cyclopentadiene, dissolved in tetrahydrofuran, were reacted with 0.91 mole of anhydrous nickel chloride. The reaction mixture was stirred at room temperature for 18 hours, then heated to reflux for four hours. Most of the tetrahydrofuran was removed by distillation, the remainder by heating in a steam bath with stirring under reduced pressure. The residue was sublimed under full vacuum. Over a 36 hour period, 56.0 parts of dicyclopentadienyl nickel were collected representing a 34.2 percent conversion based on the nickel chloride.

Under a nitrogen atmosphere, 0.29 mole of the dicyclopentadienyl nickel was dissolved in 500 ml. of petroleum ether boiling in the range of 38.5–50° C. Nitric oxide was bubbled into the dicyclopentadienyl nickel solution for 1.5 hours. After stirring for one hour, brown-green solids settled out, leaving a dark red solution which was filtered. The red filtrate was distilled in a helix-packed column at atmospheric pressure to remove most of the petroleum ether. The remainder was removed under slightly reduced pressure. Fractionation yielded 30 parts of cyclopentadienyl nickel nitrosyl representing 55.8 percent conversion based on the dicyclopentadienyl nickel. This stable, volatile, gasoline-soluble product is a deep red liquid boiling at 56.5° C./22 mm.

*Analysis.*—Calc. for C$_5$H$_5$NiNO: Ni, 38.2. Found: Ni, 37.6.

EXAMPLE III

A mixture of 980 parts dicyclopentadiene and 210 parts iron carbonyl was refluxed at 125–155° C. for 14 hours. Upon cooling, dicyclopentadienyl tetracarbonyl diiron precipitated and was filtered off. After recrystallization from methanol 142 parts of product was obtained (75 percent).

To 595 parts of powdered 6 percent sodium amalgam in tetrahydrofuran was slowly added 110 parts dicyclopentadienyl tetracarbonyl diiron in tetrahydrofuran. After stirring the mixture at room temperature for 24 hours 220 parts methyl iodide were slowly added and the mixture refluxed for 3 hours. The resulting solution was filtered, the solvent evaporated under vacuum and the product sublimed at 55° C. A yield of 47 parts cyclopentadienyl methyl dicarbonyl iron (39 percent) was obtained as a stable, volatile, fuel-soluble material melting at 82° C.

*Analysis.*—Calc. for $C_8H_8FeO_2$: Fe, 29.1. Found: Fe, 29.6.

EXAMPLE IV

A solution of sodium cyclopentadiene in tetrahydrofuran was prepared under nitrogen by reacting a sodium dispersion (50 percent sodium in mineral oil) in tetrahydrofuran with excess cyclopentadiene at less than 30° C. and then refluxing the mixture for one hour. To the stirred sodium cyclopentadiene solution, cooled to room temperature, 0.5 mole of cobaltous chloride was added rapidly with an ensuing 30° C. temperature rise. The deep violet, almost black reaction mass was refluxed for 19 hours, cooled to room temperature, and charged to a pressure autoclave.

The stirred autoclave was pressured with 2000 p.s.i.g. carbon monoxide and heated to 150° C. in one hour. At 150° C. the autoclave was pressured to 3000 p.s.i.g. with carbon monoxide and held at 150° C. for four hours. During this time a pressure drop of 400 p.s.i.g. was noted. The autoclave contents were cooled and discharged the following day.

The solvent was flash distilled from the reaction mass. The concentrated cyclopentadienyl cobalt dicarbonyl product was then fractionated using a helix-packed column operated under vacuum. The main fraction boiled at 64° C. at 12 mm. of mercury coming over as a dark red liquid. A total of 44.8 parts of product were isolated for a 50 percent yield based on cobaltous chloride. The compound is quite stable and is gasoline-soluble and volatile.

*Analysis.*—Calc. for $C_7H_5O_2Co$: Co, 35.7. Found: Co, 35.5.

EXAMPLE V

Ruthenium pentacarbonyl is reacted with a slight excess of methylcyclopentadiene and the intermediate dicyclopentadienyl ruthenium tetracarbonyl thus formed is then oxidized in a mixture of ethanol and chloroform containing a small portion of concentrated hydrochloric acid. The oxidation is conducted by slowly bubbling oxygen through the mixture. The oxidized solution is then treated with sodium cyanide and the mixture is refluxed for about 10 hours. The solvent is then evaporated and the residue extracted with chloroform and crystallized from a chloroform ethanol mixture at low temperatures by the employment of a Dry Ice-acetone bath. Methylcyclopentadienyl cyano ruthenium dicarbonyl results in good yield.

EXAMPLE VI

In a manner similar to that employed in Example V cyclopentadienyl cyano iron dicarbonyl is prepared from iron carbonyl and cyclopentadiene by first preparing dicyclopentadienyl diiron tetracarbonyl as an intermediate, oxidizing the intermediate and treating with cyanide. This cyclopentadienyl cyano iron dicarbonyl exists as yellow crystals which decompose without melting at about 120° C. The compound is soluble in chloroform, benzene and water.

EXAMPLE VII

The procedure of Example II is repeated using di(octylcyclopentadienyl)nickel in lieu of dicyclopentadienyl nickel. Octylcyclopentadienyl nickel nitrosyl results.

EXAMPLE VIII

Indenyl platinum nitrosyl is prepared by first reacting indenyl sodium with platinum dichloride and then reacting the diindenyl platinum thus formed with NO.

In each of the proceeding examples the cyclopentadienyl metal coordination compound possesses an inert gas structure in the outer electron shell of the metal atom. Since the metals in the compounds of this invention occur in the 4th, 5th and 6th periods of the Periodic Table, the resulting cyclopentadienyl coordination compound has the electron configuration of the inert gas of that period, that is, krypton, atomic number 36, xenon, atomic number 54, and radon, atomic number 86. Therefore in the expression $A_n + 5x + py + qz = S$, S becomes 36, 54 or 86. Since $A_n$ is within the parameters expressed by $(S_n - 10)$ and $(S_n - 7)$, that is since the atomic number of the metal is from 26–27, 44–47 or 76–79 all inclusive, the atomic numbers of the metal can be substituted in the expression $A_n + 5x + py + qz = S$. Since there is one cyclomatic radical in the compound $x$ is equal to 1 and likewise where there is a single type of electron donor group $y$ is equal to from 1–4 and $z$ is equal to 0. Where there are 2 types of electron donor groups $z$ is equal to from 1–2. The electron donor groups donate the number of electrons as shown by the listing of donor groups in Table I above. Thus, for each compound in the examples the expression $A_n + 5x + py + qz = S$ has been completely satisfied. For example, cyclopentadienyl methyl iron dicarbonyl, $C_5H_5Fe(CO)_2CH_3$, $26 + 5(1) + 2(2) + 1(1) = 36$; methylcyclopentadienyl nickel nitrosyl, $CH_3C_5H_5NiNO$, $28 + 5(1) + 3(1) + 0 = 36$; cyclopentadienyl ruthenium bisdimethylamine nitrosyl, $C_5H_5Ru[(CH_3)_2N]_2NO$ $$44 + 5(1) + 2(2) + 3(1) = 54$$

The preceding examples are merely illustrative of the broad class of metallic cyclomatic derivatives of the present invention. To more completely define the scope of the present invention, additional examples will be presented hereinafter. For convenience, these compounds are grouped according to the metallic atom present.

GROUP VIII ELEMENTS $(C_5H_5)Fe(CO)_2(H)$ — $26 + 5(1) + 2(2) + 1(1) = 36$
$(C_5H_5)Ru(CO)(NO)$ — $44 + 5(1) + 2(1) + 3(1) = 54$
$(C_{13}H_9)Os(H)_5$ — $76 + 5(1) + 1(5) + 0 = 86$
$(C_5H_5)Os(CH_3)_3(PI_3)$ — $76 + 5(1) + 1(3) + 2(1) = 86$
$(C_5H_5)Co(CO)_2$ — $27 + 5(1) + 2(2) + 0 = 36$
$(C_5H_5)Co(CO)(NH_3)$ — $27 + 5(1) + 2(1) + 2(1) = 36$
$(C_5H_5)Rh(PCl_3)_2$ — $45 + 5(1) + 2(2) + 0 = 54$
$(C_{13}H_9)Ir(PI_3)_2$ — $77 + 5(1) + 2(2) + 0 = 86$
$(C_5H_5)Ir(NO)(H)$ — $77 + 5(1) + 3(1) + 1(1) = 86$
$(C_5H_5)Ni(NO)$ — $28 + 5(1) + 3(1) + 0 = 36$
$(C_5H_5)Ni(CO)(C_2H_5)$ — $28 + 5(1) + 2(1) + 1(1) = 36$
$(C_9H_7)Pd(H)_3$ — $46 + 5(1) + 1(3) + 0 = 54$
$(C_5H_5)Pd(CH_3)_2(H)$ — $46 + 5(1) + 1(2) + 1(1) = 54$
$(C_5H_5)Pt(CH_3)_3$ — $78 + 5(1) + 1(3) + 0 = 86$
$(C_{13}H_9)Pt(NO)$ — $78 + 5(1) + 3(1) + 0 = 86$

GROUP IB ELEMENTS $(C_5H_5)Cu(CO)$ — $29 + 5(1) + 2(1) + 0 = 36$
$(C_9H_7)Cu(PBr_3)$ — $29 + 5(1) + 2(1) + 0 = 36$
$(C_{13}H_9)Cu(NI_3)$ — $29 + 5(1) + 2(1) + 0 = 36$
$(C_5H_5)Cu(C_2H_5)(CH_3)$ — $29 + 5(1) + 1(1) + 1(1) = 36$
$(C_5H_5)Ag(CH_3)(C_6H_5)$ — $47 + 5(1) + 1(1) + 1(1) = 54$
$(C_{13}H_9)Au(NH_3)$ — $79 + 5(1) + 2(1) + 0 = 86$
$(C_5H_5)Au(C_3H_9)(H)$ — $79 + 5(1) + 1(1) + 1(1) = 86$
$(C_9H_7)Au(H)_2$ — $79 + 5(1) + 1(2) + 0 = 86$
$(C_5H_5)Cu(H)_2$ — $29 + 5(1) + 1(2) + 0 = 36$

In the above listing of illustrative examples of the novel cyclomatic compounds of the present invention, the cyclomatic radicals are shown by their empirical formulae. Thus $C_5H_5$ represents a cyclopentadienyl radical, and $C_9H_7$ and $C_{13}H_9$ denote respectively an indenyl and fluorenyl radical. It is to be understood, however, that any of the four general types of cyclomatic radicals described hereinbefore can be employed in the compounds of the present invention.

Our compounds can be employed with liquid hydrocarbon fuels of the gasoline boiling range for improving operating characteristics of spark ignition internal combustion engines. The compounds can be used in the fuels by themselves or together with other additive components, such as scavengers, deposit modifying agents containing phosphorus and/or boron, and also other antiknock agents, such as tetraethyllead, etc.

The compounds can be added directly to the hydrocarbon fuels and the mixture subjected to stirring, mixing, or other means of agitation until a homogeneous fluid results. Alternatively, the compounds of our invention may be first made up into a concentrated fluids containing solvents, such as kerosene, toluene, hexane, and the like, as well as other additives such as scavengers, anti-oxidants and other antiknock agents, e.g., tetraethyllead. The concentrated fluids can then be added to the fuels.

To demonstrate the effectiveness of hydrocarbon fuels blended with cyclopentadienyl metal coordination compounds according to this invention, tests were made on fuels to which no antiknock agent was added and fuels which were blended in accordance with this invention. These tests were conducted according to the Research Method. The Research Method of determining octane number of a fuel is generally accepted as a method of test which gives a good indication of fuel behavior in full scale automotive engines under normal driving conditions and is the method most used by commercial installations in determining the value of a gasoline additive. The Research Method of testing antiknocks is conducted in a single cylinder engine especially designed for this purpose and referred to as the CFR engine. This engine has a variable compression ratio and during the test the temperature of the jacket water is maintained at 212° F. and the inlet air temperature is controlled at 125° F. The engine is operated at a speed of 600 r.p.m. with a spark advance of 13° before top dead center. The test method employed is more fully described in Test Procedure D-908-55 contained in 1956 edition of "ASTM Manual of Engine Test Methods for Rating Fuels." The fuel employed in these tests was a synthetic mixture which is representative of commercial gasolines in present production and was used since it gives a standard antiknock response and predictable reproducibility. This mixture consists of 20 volume percent diisobutylene, 20 volume percent toluene, 20 volume percent isooctane and 40 volume percent n-heptane. When this fuel contained no antiknock additive it had a research octane number of 91.3. Table II below shows the octane number achieved with the addition of various amounts of the additive compounds employed in this invention. These data indicate that substantial gains in octane number are provided by the compounds used in the practice of this invention.

*Table II*

| Additive | Grams of Metal/Gal. | Octane Number |
|---|---|---|
| $C_5H_5Co(CO)_2$ | 2.0 | 93.0 |
| $C_5H_5Fe(CO)_2CH_3$ | 1.0 | 93.7 |
|  | 2.0 | 96.3 |
| $C_5H_5NiNO$ | 1.0 | 93.8 |
|  | 2.0 | 95.0 |
| No additive |  | 91.2 |

In addition to the above tests, tests were conducted on the fuel which contained 3 milliliters of tetraethyllead per gallon. In a fuel thus blended the addition of 1 gram of nickel as cyclopentadienyl nickel nitrosyl gave an increase of 3.4 octane numbers over that obtainable with the tetraethyllead alone. This increase represents an outstanding improvement in antiknock effectiveness.

The cyclopentadienyl metal coordination compounds of this invention may be incorporated in paints, varnish, printing inks, synthetic resins of the drying oil type, oil enamels and the like, to impart excellent drying characteristics to such compositions. Generally speaking from 0.01 to 0.05 percent of metal as a compound of this invention is beneficially employed as a dryer in such a composition. Good results are also obtained when the compounds of this invention are used in conjunction with lead naphthanate and similar drying agents.

For example, to a typical varnish composition containing 100 parts ester gum, 173 parts of tung oil, 23 parts of linseed oil and 275 parts of white petroleum naphtha is added 4.0 parts of methylcyclopentadienyl cobalt dicarbonyl and 2.0 parts of lead naphthanate. The resulting varnish composition is found to have excellent drying characteristics. Good results are also obtained when other drying oil compositions and other compounds of this invention are employed.

The novel cyclopentadienyl compounds of this invention are also useful in wax compositions for the preparation of candles which burn with a minimum of soot formation. For this purpose, from about 0.005 to about 7 percent of metal as a compound of this invention is incorporated into the wax composition prior to fabrication of the candle. The candles containing the iron compounds of this invention are preferably prepared from paraffin wax or compositions containing a major proportion of paraffin wax. However, other materials may be incorporated into the paraffin wax with equally good results. Other waxes, stearic acid, hydrostearic acid, beeswax, microcrystalline wax, ceresin, $\beta$-naphthol, and the like, including mixtures, may be used along with the paraffin wax. As an illustrative example, a candle is prepared from a paraffin wax having a melting point of about 55° C. by adding thereto 6 percent stearic acid, 10 percent hydrostearic acid, and 2 percent iron as methylcyclopentadienyl propyl iron dicarbonyl. A candle molded from this composition burns with a minimum of soot formation.

The novel cyclopentadienyl compounds of this invention also find a number of additional uses, such as chemical intermediates in the preparation of other various organometallic compounds. The novel compounds of this invention are also profitably employed as antioxidants, catalysts, and an organic carrier of metal in high concentrations which is soluble in polar solvents, etc.

Having fully described the novel compounds of the present invention, the need therefor, and the best methods devised for their preparation, we do not intend that our invention be limited except within the spirit and scope of the appended claims.

We claim:
1. The process for forming a cyclopentadienyl metal coordination compound wherein the metal is selected from Groups VIII and IB of the periodic table and wherein the metal achieves the electron configuration of the next higher rare gas by coordination with a cyclopentadienyl hydrocarbon radical containing from five to about 13 carbon atoms in addition to electron donor groups selected from the class consisting of radicals and molecular species which contain labile electrons, said radicals and molecular species being selected from the class consisting of the hydrogen atom, univalent organic hydrocarbon radicals of 1-12 carbon atoms, the cyanide radical, carbon monoxide, ammonia, tert-amines whose organic radicals are univalent organic hydrocarbon radicals of 1-12 carbon atoms, tert-phosphines whose organic radicals are univalent organic hydrocarbon radicals of 1-12 carbon atoms, phosphorus trihalides and nitric oxide, such that said electrons assume more stable configurations in the molecule when associated with the metal to give it the configuration of the next heavier rare gas, which method comprises reacting a compound selected from the group consisting of cyclopentadienyl Grignard reagents wherein the cyclopentadienyl radical is a cyclopentadienyl hydrocarbon radical of 5 to about 13 carbon atoms, alkali metal cyclopentadienyl compounds wherein the cyclopentadienyl radical is a cyclopentadienyl hydrocarbon radical of 5 to about 13 carbon atoms, and cyclopentadienyl zinc halides wherein the cyclopentadienyl radical is a cyclopentadienyl hydrocarbon radical of 5 to about 13 carbon atoms, with a halide of a metal selected from Groups VIII and IB of the periodic table in a non-reactive liquid medium to produce a dicyclopentadienyl-Group VIII–IB-metal compound wherein each cyclopentadienyl radical is a cyclopentadienyl hydrocarbon radical of 5 to about 13 carbon atoms and reacting said dicyclopentadienyl-Group VIII–IB-metal compound with a compound capable of contributing electron donor groups to the metal atom, said electron donor groups being selected from the class consisting of radicals and molecular species which contain labile electrons, said radicals and molecular species being selected from the class consisting of the hydrogen atom, univalent organic hydrocarbon radicals of 1–12 carbon atoms, the cyanide radical, carbon monoxide, ammonia, tert-amines whose organic radicals are univalent organic hydrocarbon radicals of 1–12 carbon atoms, tert-phosphines whose organic radicals are univalent organic hydrocarbon radicals of 1–12 carbon atoms, phosphorus trihalides and nitric oxide.

2. The process of claim 1 wherein the metal halide is a nickel halide.

3. The process of claim 2 wherein the compound capable of contributing electron donor groups to the metal is nitric oxide.

4. The process of claim 3 wherein the non-reactive liquid medium is a mixture of ether and benzene.

5. A process for forming a cyclopentadienyl nickel nitrosyl compound wherein the cyclopentadienyl radical is a cyclopentadienyl hydrocarbon radical of from 5 to about 13 carbon atoms, comprising reacting a dicyclopentadienyl nickel compound wherein each cyclopentadienyl radical is a cyclopentadienyl hydrocarbon radical of from 5 to about 13 carbon atoms, with nitric oxide.

6. The process of claim 5 wherein the dicyclopentadienyl nickel reactant is formed by reacting an alkali metal cyclopentadiene compound wherein the cyclopentadienyl radical is a cyclopentadienyl hydrocarbon radical of from 5 to about 13 carbon atoms, with a nickel halide.

7. The process comprising reacting sodium cyclopentadiene in a tetrahydrofuran solution with anhydrous nickel chloride to form dicyclopentadienyl nickel, and reacting said dicyclopentadienyl nickel with nitric oxide to form cyclopentadienyl nickel nitrosyl.

References Cited by the Examiner
UNITED STATES PATENTS

| | | | |
|---|---|---|---|
| 2,777,887 | 1/57 | Weinmayer et al. | 260—429 |
| 2,818,416 | 12/57 | Brown et al. | 260—429 |
| 2,835,712 | 5/58 | Ziegler et al. | 260—429 |
| 2,868,816 | 1/59 | Petree | 260—429 |

OTHER REFERENCES

Piper et al.: J. Inorganic and Nuclear Chemistry, 1955, vol. 1, pages 165–174.

TOBIAS E. LEVOW, *Primary Examiner.*

ABRAHAM H. WINKELSTEIN, *Examiner.*